United States Patent [19]

Warfel

[11] 4,346,193

[45] Aug. 24, 1982

[54] CONTINUOUS PROCESS FOR MAKING STAR-BLOCK COPOLYMERS

[75] Inventor: David R. Warfel, Exton, Pa.

[73] Assignee: Atlantic Richfield Company, Los Angeles, Calif.

[21] Appl. No.: 260,150

[22] Filed: May 4, 1981

[51] Int. Cl.³ .......................................... C08F 297/04
[52] U.S. Cl. ..................................... 525/52; 525/250; 525/314
[58] Field of Search .......................................... 525/52

[56] References Cited

U.S. PATENT DOCUMENTS

| | | | |
|---|---|---|---|
| 3,280,084 | 10/1966 | Zelinski et al. | 260/83.7 |
| 3,281,383 | 10/1966 | Zelinski et al. | 260/23.7 |
| 3,356,763 | 12/1967 | Dollinger et al. | 525/52 |
| 3,637,554 | 1/1972 | Childers | 260/23.7 R |
| 3,985,830 | 10/1976 | Fetters et al. | 260/880 |
| 4,209,599 | 6/1980 | Brady et al. | 526/64 |

*Primary Examiner*—Stanford M. Levin
*Attorney, Agent, or Firm*—Lewis J. Young

[57] ABSTRACT

A continuous anionic solution process for preparing star-block copolymers of monovinylaromatic compounds and conjugated dienes having either monomodal or bimodal arm structure is described. The process utilizes a continuous tubular reactor made up of a sequence of four static mixer zones followed by a pressure control valve.

4 Claims, No Drawings

CONTINUOUS PROCESS FOR MAKING STAR-BLOCK COPOLYMERS

BACKGROUND OF THE INVENTION

The present invention relates to a continuous process for making elastomeric star-block copolymers.

Highly branched block copolymers, sometimes called star-block copolymers, are old in the art of anionic polymerization. These star-block copolymers are prepared by first forming linear block polymer having active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinylbenzene gave star-block copolymers having polydivinylbenzene nuclei and several identical arms of polybutadiene branching therefrom. The arms can also be either random or block copolymers of styrene and butadiene (from A-B-Li blocks, where A is polystyrene segment) where the diene is the major component.

Zelinski, U.S. Pat. No. 3,281,383, teaches similar star-block copolymers to those in U.S. Pat. No. 3,280,084, except that coupling agents such as polyepoxy compounds, polyacids, polyaldehydes, etc., are used.

Childers, U.S. Pat. No. 3,637,554, prepares rubber star-block copolymers having nuclei formed from polyepoxides, polyisocyanates, polyimines, etc., and identical arms from B-Li and A-B-Li.

Fetters et al, U.S. Pat. No. 3,985,830, discloses a product having a nucleus of more than one molecule of m-divinylbenzene and at least three polymeric arms, each being a block copolymer of conjugated diene and monovinyl aromatic monomers wherein said conjugated diene block is linked to said nucleus.

The above patents all suffer from the disadvantage of being lengthy batch processes which require cleaning out of the batch reactor after each run.

Brady et al, U.S. Pat. No. 4,209,599, discloses a process for the continuous mass polymerization of monomers in the presence of free-radical initiators in a tubular reactor provided with internal static mixers. The process requires the tubular reactor also to be a loop reactor to allow for recirculation of the reaction mass to the reactor as feed. This recirculating reactor is not suitable for the preparation of block copolymers.

SUMMARY OF THE INVENTION

We have now found that star-block copolymers can be prepared by a continuous solution polymeriztion process in the presence of a hydrocarbyllithium initiator.

The process involves the use of a continuous tubular reactor having internal zones defined by a sequence of four static mixers, each of which is maintained at a temperature of from 65° to 85° C. and each has a means for introducing new matter at the inlet of the mixer. The polymerizing solution flows through each mixer, and thus the length of the tubular reactor, by an essentially plug flow. The product is released through a pressure control valve at the end of the reactor and may then be recovered, or used in any of the conventional ways.

DETAILED DESCRIPTION OF THE INVENTION

The copolymers prepared by the instant continuous process contain 25 to 55 percent by weight, preferably 30 to 50 percent by weight, of a monovinyl aromatic compound and 45 to 75 percent by weight, preferably 50 to 70 percent by weight, of a conjugated diene having 4 to 8 carbon atoms. The monomodal copolymers have the general formula $(A-B)_m X$ where A is a non-elastomeric polymer segment based on the total monovinyl aromatic compound, B is an elastomeric segment based on the conjugated diene, m is an integer between 3 and 20, preferably between 7 and 12, and X is the radical of a polyfunctional coupling agent forming the nucleus of the star-block copolymer.

If additional initiator is added with the conjugated diene, the resulting bimodal copolymer will have the general formula $(A-B)_m X—B)_n$ where A, B and X are as above and m and n are integers whose sum is between 3 and 20, preferably between 7 and 12.

The star-block copolymers of the invention are prepared by a continuous solution process utilizing a tubular reactor having internal zones defined by a sequence of four static mixers. The mixers are each jacketed to enable temperature control of the polymerizing solution. The temperature may be the same, or different, in each of the mixer zones. The tubular reactor is maintained in a liquid full state by means of a pressure control valve mounted after the last mixer. Each mixer zone has a means at its inlet for introducing new matter. The process of preparing the desired star-block copolymer consists essentially of the steps of (a) continuously feeding to a first static mixer a solution of vinyl aromatic compound in an inert solvent and a solution of hydrocarbyllithium initiator in an inert solvent at a rate such that the time of flow of the solutions through the first mixer is between 6 and 15 minutes;

(b) continuously feeding to a second static mixer a conjugated diene monomer, at sufficient pressure to ensure the diene is in the liquid state, at a rate such that the time of flow through the second mixer is between 25 and 55 minutes;

(c) continuously feeding to a third static mixer a multifunctional coupling agent at a rate such that the time of flow through the third mixer is between 25 and 55 minutes;

(d) continuously feeding to a fourth static mixer a terminating agent;

(e) continuously removing the reaction product from the tubular reactor through the pressure control valve; and (f) separating the resulting star-block copolymer from the inert solvent.

The time of residence of the solution in the first static mixer allows essentially complete polymerization of the vinyl aromatic compound to form linear segments (A-Li) of the compound having lithium ions at the ends. The rate of feed will vary depending on diameter of the tubular reactor and the length of the static mixer zone. The concentration of the vinyl aromatic compound in inert solvent fed to the reactor in step (a) may vary, but should not exceed about 12 weight percent of monomer. Higher percentage of styrene would cause an increase in viscosity on addition of the diene to a point which could not be tolerated in the reactor. The concentration should be chosen such that, when the vinyl aromatic compound and the conjugated diene have both polymerized completely, the resultant percent solids is not greater than about 25 weight percent.

Similarly, the residence time in the second static mixer allows essentially complete polymerization of the conjugated diene monomer to form linear diblock segments (A-B-Li). If additional initiator is added to the inlet of the mixer with the diene monomer, then both diblock segments (A-B-Li) and homoblock segments (B-Li) are prepared. The ratio of A-B-Li to B-Li segments formed is determined by the ratio of the amount of initiator added in step (a) to that in step (b). The rate of feed of the diene monomer, and the additional initiator if used, is again varied to depend on the diameter of the tubular reactor and the length of the second static mixer zone to maintain the desired residence time.

The residence time in the third static mixer is again sufficient to allow essentially complete coupling of the lithiated segments formed in (b) to form the star-block copolymers $(A-B)_m X$ or $(A-B)_m X$—$B)_n$ where A, B, X, m and n are as hereinbefore defined.

The residence time in the fourth static mixer is not critical because the termination reaction is essentially instantaneous.

The separation of the final star-block copolymer from the inert solvent can be accomplished by flashing off the majority of the solvent and then vacuum drying the residue to produce polymer in the form of crumb. The last drying can be accomplished by extrusion of the solution in a devolatilizing extruder followed by a pelletizing step. It is also possible to mix the solvent/copolymer product immediately with mineral oil to form, on devolatilization, an oil-extended elastomer. Additionally, the other ingredients for shoe-sole compounds or adhesive compounds can be mixed with the mineral oil and copolymer/solvent product to form directly the final shoe-sole compound or adhesive compound in pellet form.

The monovinyl aromatic compound useful in the invention is preferably styrene, but may be alkyl substituted styrenes which have similar copolymerization characteristics, such as, alphamethylstyrene and the ring substituted methylstyrenes, ethylstyrenes and t-butylstyrene.

The amount of monovinyl aromatic compound useful in the invention is between 25 and 55 percent by weight, and preferably 30 to 50 percent by weight, based on the total weight of monomers utilized.

The hydrocarbyllithium initiators useful in the invention are the known alkyllithium compounds, such as methyllithium, n-butyllithium, sec-butyllithium; the cyclo-alkyllithium compounds, such as cyclo-hexyllithium; and the aryllithium compounds, such as phenyllithium, p-tolyllithium and naphthyllithium.

The amounts of hydrocarbyllithium added should be between 0.2 and 10.0 millimoles per mole of monomer. If added with the diene also, the amount of initiator added should be the same or slightly greater amount than that added with the vinyl aromatic compound. The total amount of initiator used depends on the molecular weight and number of polymer chains desired.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclohexane, benzene, toluene, xylene and the like. The polymerization is carried out in the absence of air, moisture, or any other impurity which is known to be detrimental to anionic catalyst systems.

The polyfunctional coupling agents suitable for the invention may be any of the materials known to have functional groups which can react with carbon to lithium bonds to add the carbon chain to the functional group. Typical examples of the suitable coupling agents are the polyepoxides, such as epoxidized linseed oil; the polyesters such as diethyl adipate; the polyhalides, such as silicon tetrahalide; the polyisocyanates, such as benzene-1,2,4-triisocyanate; the polyimines, such as tri(1-aziridinyl) phosphine oxide; the polyaldehydes, such as 1,4,7-naphthalene tricarboxaldehyde; the polyketones, such as 2,4,6-heptanetrione; the polyanhydrides, such as pyromellitic dianhydride; and the polyacid chlorides, such as mellitic acid chloride. Especially useful, and preferred herein, are the polyvinyl aromatic compounds such as divinylbenzene, which although only difunctional as monomers, can polymerize to form polyfunctional agents in situ and serve as coupling agents. Suitable are the ortho-, meta- or para-divinylbenzenes, or mixtures thereof.

The amount and type of coupling agent used is dependent upon the number of polymer chains having lithium terminated ends and the number of arms desired per star-block molecule. Thus, for agents having a fixed number of functional groups such as silicon tetrachloride, an equivalent of agent per equivalent of lithium terminated polymer chains, gives a four armed star-block copolymer. In the case of difunctional agents which polymerize during the coupling reaction, such as divinylbenzene, the amounts of agent to be used must be determined for the conditions of reaction, since the number of equivalent functional sites is variable. However, the amounts will vary only from 1 to 10 parts by weight, and preferably 2.0 to 8.0 equivalents, of divinylbenzene per 1.0 equivalent of lithium initiator used.

The following example is given to illustrate the invention, but not to limit the claims.

EXAMPLE

To illustrate the process of the invention, a tubular reactor made up of three separate jacketed, 2.54 cm diameter static mixer units for preparing the polystyrene, polydiene and coupled star portions of the block copolymer, in that order, is assembled. A fourth, non-jacketed static mixer unit is connected in series to form a termination mixer. For convenience we will call these static mixer units the styrene polymerization tube, the diene polymerization tube, the coupling tube and the termination tube. The termination tube is followed by a pressure control valve to maintain the reactor in a liquid filled mode.

The proposed reactor set up is as follows:
Length of styrene polymerization tube: 300 cm
Length of diene polymerization tube: 900 cm
Length of coupling tube: 900 cm
Length of termination tube: 50 cm
Length between tubes: 1 cm
Plug flow rate down 2.54 cm tube: 0.5 cm/sec Temperature styrene polymerization tube: 70° C.
Temperature diene polymerization tube: 80° C.
Temperature coupling tube: 80° C.

Temperature termination tube: 70° C.

Residence time styrene polymerization tube: 10 min
Residence time diene polymerization tube: 30 min
Residence time coupling tube: 30 min
Residence time termination tube: 100 sec Pressure control valve setting: 150 psi Final polymer solids: 10.0% by weight Solids at end of polystyrene polymerization tube: 4.6% by weight A solution of 46 g styrene per liter of cyclohexane is pumped into the inlet of the styrene polymerization tube at a rate of 2 ml/sec. At the same time a solution of 0.062 mole per liter of sec-butyllithium in cyclohexane is pumped into the same inlet at a rate of 0.53 ml/sec. After 10 minutes, the styrene solution and catalyst will have traveled the length of the styrene polymerization tube and will form linear polystyryl lithium blocks of number average molecular weight ($M_n$) 28,000. At the inlet of the diene polymerization tube, butadiene is pumped in at a rate of 0.108 gm/sec. Thirty minutes later, the solution contains lithium terminated linear block copolymer having a 28,000 $M_n$ polystyrene block followed by a 32,900 $M_n$ polybutadiene block. The solution continues to flow in a plug-flow fashion from the diene polymerization tube into the coupling tube. At the inlet to the coupling tube a solution of divinylbenzene (as 55% active DVB) is pumped in at a rate of $1.48 \times 10^{-5}$ moles/sec. The ratio of DVB/RLi at this point is 4.5 and a star-block copolymer having approximately 10 arms per molecule will be formed. After 30 minutes residence time, the star-block copolymer flows into the termination tube. At the inlet of the termination tube, methanol is pumped into the reactor at a rate of $9.74 \times 10^{-6}$ moles/sec. The terminated star-block polymer of $M_n$ 609,000 and having 46 weight percent styrene and 54 weight percent butadiene exits the pressure control valve at a rate of 720 gm/hr in the form of a 10 percent by weight solution of polymer in cyclohexane. The 10% solution can be flashed to remove the majority of the solvent, followed by recovery of the neat polymer by extrusion in a devolatilizing extruder to form pellets or by oven drying to form crumb. Alternatively, the 10% solution can be flashed to form about a 20% solids solution, which can subsequently be mixed directly with mineral oil and, if desired, other ingredients of shoe-sole compounds. This mixture can then be extruded and pelletized from a devolatilizing extruder to form oil-extended elastomer pellets or shoe-sole compound in pellet form directly.

I claim:

1. A continuous anionic solution polymerization process for producing star-block copolymers in a continuous tubular reactor having internal zones defined by a sequence of four static mixers, each of which is maintained at a temperature of from 65° to 85° C. and each has a means for introducing new matter at the inlet of the mixer, and the tubular reactor having a pressure control valve mounted after the last mixer to maintain the reactor in a liquid full mode at all times, said process consisting essentially of the steps of
    (a) continuously feeding to a first static mixer a solution of vinyl aromatic compound in an inert solvent and a solution of hydrocarbyllithium initiator in an inert solvent at a rate such that the time of flow of the solutions through the first mixer is between 6 and 15 minutes;
    (b) continuously feeding to a second static mixer a conjugated diene monomer, at sufficient pressure to ensure the diene is in the liquid state, at a rate such that the time of flow through the second mixer is between 25 and 55 minutes;
    (c) continuously feeding to a third static mixer a multifunctional coupling agent at a rate such that the time of flow through the third mixer is between 25 and 55 minutes;
    (d) continuously feeding to a fourth static mixer a terminating agent;
    (e) continuously removing the reaction product from the tubular reactor through the pressure control valve; and
    (f) separating the resulting star-block copolymer from the inert solvent.

2. The process of claim 1 wherein the weight ratio of monovinyl aromatic compound to conjugated diene is from 25/75 to 55/45.

3. The process of claim 1 wherein the monovinyl aromatic compound is styrene, the conjugated diene is butadiene and the polyfunctional coupling agent is selected from o-divinylbenzene, m-divinylbenzene, p-divinylbenzene and mixtures thereof.

4. The process of claim 1 wherein a solution of hydrocarbyllithium initiator in an inert solvent is fed to the second static mixer along with the conjugated diene monomer, whereby a star-block copolymer having bimodal arm structure is produced.

* * * * *